(12) United States Patent
Watanabe

(10) Patent No.: US 11,370,849 B2
(45) Date of Patent: Jun. 28, 2022

(54) METHOD FOR PRODUCING CARBOXY GROUP-CONTAINING HYDROGENATED NITRILE RUBBER

(71) Applicant: ZEON CORPORATION, Tokyo (JP)

(72) Inventor: Yasuaki Watanabe, Tokyo (JP)

(73) Assignee: ZEON CORPORATION, Tokyo (JP)

( * ) Notice: Subject to any disclaimer, the term of this patent is extended or adjusted under 35 U.S.C. 154(b) by 112 days.

(21) Appl. No.: 16/963,636

(22) PCT Filed: Jan. 18, 2019

(86) PCT No.: PCT/JP2019/001510
§ 371 (c)(1),
(2) Date: Jul. 21, 2020

(87) PCT Pub. No.: WO2019/146526
PCT Pub. Date: Aug. 1, 2019

(65) Prior Publication Data
US 2021/0061927 A1    Mar. 4, 2021

(30) Foreign Application Priority Data
Jan. 26, 2018 (JP) .............................. JP2018-011379

(51) Int. Cl.
*C08C 19/02* (2006.01)
*C08L 15/00* (2006.01)

(52) U.S. Cl.
CPC ............ *C08C 19/02* (2013.01); *C08L 15/005* (2013.01)

(58) Field of Classification Search
CPC .................................. C08C 19/02; C08C 4/00
See application file for complete search history.

(56) References Cited

U.S. PATENT DOCUMENTS

| | | | | |
|---|---|---|---|---|
| 8,153,712 B2 * | 4/2012 | Nagamori | ............... | C08L 33/20 524/236 |
| 9,969,886 B2 * | 5/2018 | Inoue | ...................... | C08L 33/18 |
| 2003/0171500 A1 * | 9/2003 | Guo | ........................ | C08C 19/02 525/329.1 |
| 2011/0301300 A1 | 12/2011 | Iizuka | | |
| 2013/0281604 A1 | 10/2013 | Senda et al. | | |
| 2014/0093729 A1 | 4/2014 | Furusawa | | |
| 2017/0355854 A1 | 12/2017 | Inoue et al. | | |
| 2018/0134831 A1 | 5/2018 | Shiono | | |
| 2018/0194924 A1 * | 7/2018 | Mosaki | ................ | C08L 15/005 |
| 2019/0093723 A1 | 3/2019 | Inoue | | |
| 2019/0093724 A1 | 3/2019 | Oyama et al. | | |

FOREIGN PATENT DOCUMENTS

| | | |
|---|---|---|
| CN | 102300882 A | 12/2011 |
| CN | 103608513 A | 2/2014 |
| CN | 108779297 A | 11/2018 |
| EP | 2009050 A1 | 12/2008 |
| EP | 2719824 A1 | 4/2014 |
| JP | 2010-031194 A | 2/2010 |
| WO | 2016/104350 A1 | 6/2016 |
| WO | 2016/190213 A1 | 12/2016 |
| WO | 2017/010370 A1 | 1/2017 |

OTHER PUBLICATIONS

Sep. 24, 2021 Search Report issued in European Patent Application No. 19743563.9.
Jul. 28, 2020 International Preliminary Report on Patentability issued in International Patent Application No. PCT/JP2019/001510.
Apr. 2, 2019 International Search Report issued in International Patent Application No. PCT/JP2019/001510.

* cited by examiner

*Primary Examiner* — Robert C Boyle
(74) *Attorney, Agent, or Firm* — Oliff PLC

(57) ABSTRACT

A method for producing a carboxy group-containing hydrogenated nitrile rubber includes a step of preparing a latex of a carboxy group-containing nitrile rubber by polymerizing a monomer mixture in a dispersive medium, the monomer mixture containing at least an α,β-ethylenically unsaturated nitrile monomer and a carboxy group-containing monomer; a step of heating the latex of the carboxy group-containing nitrile rubber at 50 to 85° C. in the state where the pH is adjusted in the range of 8.5 to 12; and a step of subjecting the latex of the carboxy group-containing nitrile rubber after the heating to a hydrogenation reaction in the presence of a hydrogenation catalyst in the state where the pH is adjusted in the range of 5 to 8.

6 Claims, No Drawings

METHOD FOR PRODUCING CARBOXY GROUP-CONTAINING HYDROGENATED NITRILE RUBBER

TECHNICAL FIELD

The present invention relates to a method for producing a carboxy group-containing hydrogenated nitrile rubber, and more specifically relates to a method for producing a carboxy group-containing hydrogenated nitrile rubber with high production efficiency.

BACKGROUND ART

Conventionally, nitrile rubbers (acrylonitrile-butadiene copolymerized rubbers) have been used as a material for rubber parts for automobiles such as hoses and tubes, making use of their oil resistance, mechanical properties, chemical resistance, and the like. In addition, a hydrogenated nitrile rubber (a hydrogenated acrylonitrile-butadiene copolymerized rubber), which is obtained by hydrogenating carbon-carbon double bonds in the polymer backbone of a nitrile rubber, has higher heat resistance, and thus, is used for rubber parts such as seals, belts, hoses, and diaphragms.

Moreover, a carboxy group-containing hydrogenated nitrile rubber is known, which is prepared by introducing a carboxy group as a modifying group to the hydrogenated nitrile rubber to impart a variety of properties such as permanent compression set resistance to such a hydrogenated nitrile rubber (see Patent Document 1, for example).

RELATED ART DOCUMENTS

Patent Documents

Patent Document 1: International Publication No. WO 2016/104350

SUMMARY OF THE INVENTION

Problem to be Solved by the Invention

On the other hand, there is a demand that such a carboxy group-containing hydrogenated nitrile rubber should have improved productivity in its production process, especially, in a hydrogenation reaction step.

The present invention has been made in consideration of such circumstances. An object of the present invention is to provide a method for producing a carboxy group-containing hydrogenated nitrile rubber with high production efficiency.

Means for Solving Problems

The present inventor, who has conducted extensive research, has found that the above object can be achieved by heating a latex of a carboxy group-containing nitrile rubber at a predetermined temperature in the state where the pH is adjusted in a range of 8.5 to 12, adjusting the pH of the latex of the carboxy group-containing nitrile rubber after the heating in a range of 5 to 8, and performing a hydrogenation reaction, and have completed the present invention.

In other words, the present invention provides a method for producing a carboxy group-containing hydrogenated nitrile rubber, comprising a step of preparing a latex of a carboxy group-containing nitrile rubber by emulsion polymerizing a monomer mixture in a dispersive medium, the monomer mixture containing at least an $\alpha,\beta$-ethylenically unsaturated nitrile monomer and a carboxy group-containing monomer;

a step of heating the latex of the carboxy group-containing nitrile rubber at 50 to 85° C. in the state where the pH is adjusted in a range of 8.5 to 12; and a step of subjecting the latex of the carboxy group-containing nitrile rubber after the heating to a hydrogenation reaction in the presence of a hydrogenation catalyst in the state where the pH is adjusted in the range of 5 to 8.

In the production method according to the present invention, it is preferred that the latex of the carboxy group-containing nitrile rubber be heated under a reduced pressure condition.

It is preferred that the production method according to the present invention further comprise a step of removing the hydrogenation catalyst from the latex of the carboxy group-containing nitrile rubber after the hydrogenation reaction.

It is preferred that in the production method according to the present invention, the carboxy group-containing hydrogenated nitrile rubber contain 5 to 60 wt % of the $\alpha,\beta$-ethylenically unsaturated nitrile monomer and 1 to 30 wt % of the carboxy group-containing monomer.

The present invention provides a method for producing a cross-linkable rubber composition, comprising mixing a carboxy group-containing hydrogenated nitrile rubber produced by the production method according to the present invention with a cross-linking agent.

Moreover, the present invention provides a method for producing a cross-linked rubber, comprising cross-linking a cross-linkable rubber composition produced by the production method according to the present invention.

Effects of Invention

The present invention can produce a carboxy group-containing hydrogenated nitrile rubber with high production efficiency.

DESCRIPTION OF EMBODIMENTS

The method for producing a carboxy group-containing hydrogenated nitrile rubber according to the present invention comprises:

a step (polymerization step) of preparing a latex of a carboxy group-containing nitrile rubber by polymerizing a monomer mixture in a dispersive medium, the monomer mixture containing at least an $\alpha,\beta$-ethylenically unsaturated nitrile monomer and a carboxy group-containing monomer;

a step (heating step) of heating the latex of the carboxy group-containing nitrile rubber at 50 to 85° C. in the state where the pH is adjusted in the range of 8.5 to 12; and a step (hydrogenation reaction step) of subjecting the latex of the carboxy group-containing nitrile rubber after the heating to a hydrogenation reaction in the presence of a hydrogenation catalyst in the where the pH is adjusted in the range of 5 to 8.

<Polymerization Step>

The polymerization step in the production method according to the present invention is a step of preparing a latex of a carboxy group-containing nitrile rubber by emulsion polymerizing a monomer mixture in a dispersive medium, the monomer mixture containing at least an α,β-ethylenically unsaturated nitrile monomer and a carboxy group-containing monomer.

The α,β-ethylenically unsaturated nitrile monomer can be any α,β-ethylenically unsaturated compound having a nitrile group. Examples thereof include acrylonitrile; α-halogenoacrylonitriles such as α-chloroacrylonitrile and α-bromoacrylonitrile; α-alkyl acrylonitriles such as methacrylonitrile and ethacrylonitrile; and the like. Among these, preferred are acrylonitrile and methacrylonitrile, and particularly preferred is acrylonitrile. These α,β-ethylenically unsaturated nitrile monomers may be used alone or in combination.

The amount of the α,β-ethylenically unsaturated nitrile monomer to be used may be appropriately determined according to the composition of the carboxy group-containing hydrogenated nitrile rubber finally prepared. The proportion of α,β-ethylenically unsaturated nitrile monomer units in the carboxy group-containing hydrogenated nitrile rubber is preferably 5 to 60 wt %, more preferably 10 to 60 wt %, still more preferably 10 to 55 wt %. By adjusting the amount of the monomer to be used to control the proportion of α,β-ethylenically unsaturated nitrile monomer units within this range, the resulting carboxy group-containing hydrogenated nitrile rubber can provide a cross-linked rubber having high oil resistance and cold resistance.

The carboxy group-containing monomer can be any monomer which is copolymerizable with the α,β-ethylenically unsaturated nitrile monomer and has one or more unsubstituted (free) carboxy groups such as unesterified carboxyl groups. By using the carboxy group-containing monomer, the resulting rubber can have carboxy groups introduced thereto.

Examples of the carboxy group-containing monomer used in the present invention include α,β-ethylenically unsaturated monocarboxylic acid monomers, α,β-ethylenically unsaturated polyvalent carboxylic acid monomers, α,β-ethylenically unsaturated dicarboxylic acid monoester monomers, and the like. The carboxy group-containing monomer also includes these monomers where the carboxy group forms a salt of a carboxylic acid. Furthermore, anhydrides of α,β-ethylenically unsaturated polyvalent carboxylic acids can also be used as the carboxy group-containing monomer because a carboxy group is famed as a result of cleavage of the acid anhydride group after copolymerization.

Examples of the α,β-ethylenically unsaturated monocarboxylic acid monomers include acrylic acid, methacrylic acid, ethylacrylic acid, crotonic acid, cinnamic acid, and the like.

Examples of the α,β-ethylenically unsaturated polyvalent carboxylic acid monomers include butenedioic acids such as fumaric acid and maleic acid, itaconic acid, citraconic acid, mesaconic acid, glutaconic acid, allylmalonic acid, teraconic acid, and the like. Examples of the anhydrides of the α,β-unsaturated polyvalent carboxylic acids include maleic anhydride, itaconic anhydride, citraconic anhydride, and the like.

Examples of the α,β-ethylenically unsaturated dicarboxylic acid monoester monomers include monoalkyl maleate esters such as monomethyl maleate, monoethyl maleate, monopropyl maleate, and mono-n-butyl maleate; monocycloalkyl maleate esters such as monocyclopentyl maleate, monocyclohexylmaleate, and monocycloheptyl maleate; monoalkylcycloalkyl maleate esters such as monomethylcyclopentyl maleate and monoethylcyclohexyl maleate; monoalkyl fumarate esters such as monomethyl fumarate, monoethyl fumarate, monopropyl fumarate, and mono-n-butyl fumarate; monocycloalkyl fumarate esters such as monocyclopentyl fumarate, monocyclohexyl fumarate, and monocycloheptyl fumarate; monoalkylcycloalkyl fumarate esters such as monomethylcyclopentyl fumarate and monoethylcyclohexyl fumarate; monoalkyl citraconate esters such as monomethyl citraconate, monoethyl citraconate, monopropyl citraconate, and mono-n-butyl citraconate; monocycloalkyl citraconate esters such as monocyclopentyl citraconate, monocyclohexyl citraconate, and monocycloheptyl citraconate; monoalkylcycloalkyl citraconate esters such as monomethylcyclopentyl citraconate and monoethylcyclohexyl citraconate; monoalkyl itaconate esters such as monomethyl itaconate, monoethyl itaconate, monopropyl itaconate, and mono-n-butyl itaconate; monocycloalkyl itaconate esters such as monocyclopentyl itaconate, monocyclohexyl itaconate, and monocycloheptyl itaconate; monoalkylcycloalkyl itaconate esters such as monomethylcyclopentyl itaconate and monoethylcyclohexyl itaconate; and the like.

These carboxy group-containing monomers may be used alone or in combination. Among these, preferred are α,β-ethylenically unsaturated dicarboxylic acid monoester monomers, more preferred are α,β-ethylenically unsaturated dicarboxylic acid monoalkyl ester monomers, still more preferred are monoalkyl maleate esters, and particularly preferred is mono-n-butyl maleate to prepare a carboxy group-containing hydrogenated nitrile rubber which can provide a cross-linked rubber having higher permanent compression set resistance. The alkyl esters above preferably have $C_2$ to $C_8$ alkyl groups.

The amount of the carboxy group-containing monomer to be used may be appropriately determined according to the composition of the carboxy group-containing hydrogenated nitrile rubber finally prepared. The proportion of carboxy group-containing monomer units in carboxy group-containing hydrogenated nitrile rubber is preferably 1 to 30 wt %, more preferably 2 to 25 wt %, still more preferably 2 to 20 wt %. By adjusting the amount of the monomer to be used to control the proportion of carboxy group-containing monomer units within this range, the resulting carboxy group-containing hydrogenated nitrile rubber can provide a cross-linked rubber having higher mechanical properties and permanent compression set resistance.

In the production method according to the present invention, to provide a carboxy group-containing hydrogenated nitrile rubber having rubber elasticity, it is preferred that a conjugated diene monomer be further added to the monomer mixture used in polymerization, and be further involved in the copolymerization.

The conjugated diene monomer is preferably conjugated diene monomers having 4 to 6 carbon atoms, such as 1,3-butadiene, isoprene, 2,3-dimethyl-1,3-butadiene, 1,3-pentadiene, and chloroprene, more preferably 1,3-butadiene and isoprene, particularly preferably 1,3-butadiene. These conjugated diene monomers may be used alone or in combination.

The amount of the conjugated diene monomer to be used may be appropriately determined according to the composition of the carboxy group-containing hydrogenated nitrile rubber finally prepared. The proportion of conjugated diene monomer units (also including those hydrogenated) in the carboxy group-containing hydrogenated nitrile rubber is preferably 10 to 80 wt %, more preferably 20 to 70 wt %, still more preferably 30 to 70 wt %. By adjusting the amount of the monomer to be used to control the proportion of conjugated diene monomer units within this range, the resulting carboxy group-containing hydrogenated nitrile rubber can provide a cross-linked rubber having high rubber elasticity while the heat resistance and the chemical stability are favorably maintained.

In the production method according to the present invention, to further improve cold resistance, an $\alpha,\beta$-ethylenically unsaturated monocarboxylic acid ester monomer may be further added to the monomer mixture used in polymerization, and may be further involved in the copolymerization.

Examples of the $\alpha,\beta$-ethylenically unsaturated monocarboxylic acid ester monomer include (meth)acrylate esters (abbreviation of "methacrylate esters and acrylate esters". The same applies to the description below) having an alkyl group with 1 to 18 carbon atoms, such as methyl acrylate, ethyl acrylate, n-butyl acrylate, isobutyl acrylate, n-dodecyl acrylate, methyl methacrylate, and ethyl methacrylate; (meth)acrylate esters having an alkoxyalkyl group with 2 to 18 carbon atoms, such as 1-methoxyethyl acrylate, 2-methoxyethyl acrylate, ethoxypropyl acrylate, methoxybutyl acrylate, ethoxydodecyl acrylate, methoxyethyl methacrylate, methoxybutyl methacrylate, and ethoxypentyl methacrylate; (meth)acrylate esters having a cyanoalkyl group with 2 to 12 carbon atoms, such as $\alpha$-cyanoethyl acrylate, $\alpha$-cyanoethyl methacrylate, and cyanobutyl methacrylate; (meth)acrylate esters having a hydroxyalkyl group with 1 to 12 carbon atoms, such as 2-hydroxyethyl acrylate, 2-hydroxypropyl acrylate, and 2-hydroxyethyl methacrylate; (meth)acrylate esters having a fluoroalkyl group with 1 to 12 carbon atoms, such as trifluoroethyl acrylate and tetrafluoropropyl methacrylate; and the like. Among these, preferred are (meth)acrylate esters having an alkyl group with 1 to 18 carbon atoms and (meth)acrylate esters having an alkoxyalkyl group with 2 to 18 carbon atoms, more preferred are n-butyl acrylate, 1-methoxyethyl acrylate, and 2-methoxyethyl acrylate, and particularly preferred is n-butyl acrylate.

Although the $\alpha,\beta$-ethylenically unsaturated monocarboxylic acid ester monomer can be used in any amount, the proportion of $\alpha,\beta$-ethylenically unsaturated monocarboxylic acid ester monomer units contained in the carboxy group-containing hydrogenated nitrile rubber is preferably 1 to 50 wt %, more preferably 5 to 45 wt %, still more preferably 10 to 40 wt %. By adjusting the amount of the monomer to be used to control the proportion of $\alpha,\beta$-ethylenically unsaturated monocarboxylic acid ester monomer units within this range, the resulting carboxy group-containing hydrogenated nitrile rubber can provide a cross-linked rubber having higher cold resistance.

In the production method according to the present invention, in addition to the monomers described above, different monomers copolymerizable with these monomers may be further added to the monomer mixture used in polymerization, and may be further involved in the copolymerization. Examples of such different monomers include ethylene, $\alpha$-olefin monomers, aromatic vinyl monomers, fluorine-containing vinyl monomers, copolymerizable anti-aging agents, and the like.

The $\alpha$-olefin monomers are preferably those having 3 to 12 carbon atoms. Examples thereof include propylene, 1-butene, 4-methyl-1-pentene, 1-hexene, 1-octene, and the like.

Examples of the aromatic vinyl monomers include styrene, $\alpha$-methylstyrene, vinylpyridine, and the like.

Examples of the fluorine-containing vinyl monomers include fluoroethyl vinyl ether, fluoropropyl vinyl ether, o-trifluoromethylstyrene, pentafluorovinyl benzoate, difluoroethylene, tetrafluoroethylene, and the like.

Examples of the copolymerizable anti-aging agents include N-(4-anilinophenyl)acrylamide, N-(4-anilinophenyl)methacrylamide, N-(4-anilinophenyl)cinnamamide, N-(4-anilinophenyl)crotonamide, N-phenyl-4-(3-vinylbenzyloxy)aniline, N-phenyl-4-(4-vinylbenzyloxy)aniline, and the like.

The different copolymerizable monomers listed above may be used alone or in combination. Although not particularly limited, the proportion of the different copolymerizable monomers used in the carboxy group-containing hydrogenated nitrile rubber is preferably 50 wt % or less, more preferably 40 wt % or less, still more preferably 10 wt % or less in terms of the proportion of units of these monomers contained.

In the polymerization step in the production method according to the present invention, emulsion polymerization can be performed using polymerization additives usually used, in addition to an emulsifier, a polymerization initiator, and a molecular weight modifier.

Examples of the emulsifier include, but should not be limited to, nonionic emulsifiers such as polyoxyethylene alkyl ethers, polyoxyethylene alkyl phenol ethers, polyoxyethylene alkyl esters, and polyoxyethylene sorbitan alkyl esters; anionic emulsifiers such as salts of fatty acids such as myristic acid, palmitic acid, oleic acid, and linolenic acid, alkylbenzenesulfonate salts such as sodium dodecylbenzenesulfonate, condensates of naphthalenesulfonates and formalin, higher alcohol sulfated ester salts, and alkyl sulfosuccinate salts; copolymerizable emulsifiers such as sulfoesters of $\alpha,\beta$-unsaturated carboxylic acids, sulfate esters of $\alpha,\beta$-unsaturated carboxylic acids, and sulfoalkyl aryl ethers; and the like. It is preferred that the emulsifier be used in an amount of preferably 0.1 to 10 parts by weight, more preferably 0.5 to 5 parts by weight relative to 100 parts by weight of the monomer mixture used in polymerization.

The polymerization initiator is not particularly limited as long as it is a radical initiator. Examples thereof include inorganic peroxides such as potassium persulfate, sodium persulfate, ammonium persulfate, potassium perphosphate, and hydrogen peroxide; organic peroxides such as t-butyl peroxide, cumene hydroperoxide, p-menthane hydroperoxide, di-t-butyl peroxide, t-butylcumyl peroxide, acetyl peroxide, isobutyryl peroxide, octanoyl peroxide, dibenzoyl peroxide, 3,5,5-trimethylhexanoyl peroxide, and t-butyl peroxyisobutyrate; azo compounds such as azobisisobutyronitrile, azobis-2,4-dimethylvaleronitrile, azobiscyclohexanecarbonitrile, and methyl azobisisobutyrate; and the like. These polymerization initiators can be used alone or in combination. Preferred polymerization initiators are inorganic or organic peroxides. When a peroxide is used as a polymerization initiator, it can also be used in combination with a reducing agent such as sodium bisulfite or ferrous sulfate as a redox polymerization initiator. The polymerization initiator is used in an amount of preferably 0.01 to 2 parts by weight relative to 100 parts by weight of the monomer mixture used in polymerization.

The molecular weight modifier is not particularly limited, and any compound having a mercapto group can be preferably used. Examples thereof include compounds having 9 to 12 carbon atoms and a mercapto group such as 2,2,4,6,6-pentamethyl-4-heptanethiol, 2,4,4,6,6-pentamethyl-2-heptanethiol, 2,3,4,6,6-pentamethyl-2-heptanethiol, and 2,3,4,6,6-pentamethyl-3-heptanethiol; compounds having 13 to 16 carbon atoms and a mercapto group such as 2,2,4,6,6-pentamethyl-4-octanethiol and 2,2,4,6,6,8,8-heptamethyl-4-nonanethiol; t-dodecylmercaptan (mixture of compounds having 9 to 16 carbon atoms and a mercapto group); and the like. In combination with or instead of these compounds having a mercapto group, halogenated hydrocarbons such as carbon tetrachloride, methylene chloride, and methylene bromide; α-methylstyrene dimers; sulfur-containing compounds such as tetraethylthiuram disulfide, dipentamethylenethiuram disulfide, and diisopropylxanthogen disulfide; and the like may be used. These can be used alone or in combination. The molecular weight modifier is used in an amount of preferably 0.01 to 2 parts by weight, more preferably 0.05 to 1 parts by weight relative to 100 parts by weight of the monomer mixture used in polymerization.

The dispersive medium usually used in emulsion polymerization is water. The amount of water is preferably 80 to 500 parts by weight, more preferably 80 to 300 parts by weight relative to 100 parts by weight of the monomer mixture used in polymerization.

In emulsion polymerization, polymerization additives such as a polymerization terminator, a chelating agent, a builder, a stabilizer, a dispersant, a pH adjuster, an oxygen absorbing agent, a particle size adjuster, and the like can be further used as needed. When these polymerization additives are used, the type and the amount thereof to be used are not particularly limited.

Although not particularly limited, the polymerization conversion ratio in the emulsion polymerization is preferably 60 to 95%, more preferably 65 to 90%, still more preferably 75 to 90% to improve the properties of the resulting polymer and provide high productivity. The polymerization conversion ratio in the emulsion polymerization may be 87% or less. The production method according to the present invention enables favorable progression of the hydrogenation reaction even if the polymerization conversion ratio in the emulsion polymerization is low and the resulting latex contains a relatively large amount of volatile components.

Although not particularly limited, the latex of the carboxy group-containing nitrile rubber prepared through such a polymerization step can have a pH of usually 1 to 5, preferably 2 to 5, more preferably 2 to 4.

<Heating Step>

The heating step in the production method according to the present invention is a step of heating the latex of the carboxy group-containing nitrile rubber prepared through the polymerization step above at 50 to 85° C. in the state where the pH is adjusted in the range of 8.5 to 12.

In the production method according to the present invention, the latex of the carboxy group-containing nitrile rubber is heated at the above-mentioned temperature in the state where the pH is adjusted in the range of 8.5 to 12 and on the condition inhibiting the progression of the hydrogenation reaction. Thereafter, the pH of the latex of the carboxy group-containing nitrile rubber subjected to such heating is adjusted to 5 to 8, and the hydrogenation reaction is performed in the state where the pH is adjusted to 5 to 8. This results in favorable progression of the hydrogenation reaction even with a relatively small amount of a hydrogenation catalyst is used in the hydrogenation reaction. As a result, the carboxy group-containing hydrogenated nitrile rubber can be produced with high production efficiency. Specifically, the hydrogenation reaction with a relatively small amount of the hydrogenation catalyst used in the hydrogenation reaction can favorably progress in the production method according to the present invention, thus reducing the amount of the hydrogenation catalyst to be used. Furthermore, when the hydrogenation catalyst is recovered and removed after the hydrogenation reaction, such a reduction in amount of the hydrogenation catalyst to be used results in efficient recovery and removal of the hydrogenation catalyst, thus providing high productivity. In particular, because the hydrogenation catalyst used in the hydrogenation reaction is usually an expensive noble metal or the like, it is desired that the amount of the hydrogenation catalyst to be used is reduced as much as possible from the viewpoint of productivity. Furthermore, the hydrogenation catalyst is recovered and removed from the viewpoint of productivity as needed. Such a hydrogenation catalyst can be efficiently recovered and removed in the production method according to the present invention, resulting in high productivity even if the recovery and removal of the hydrogenation catalyst is needed.

In particular, among nitrile rubbers, the present inventor has conducted extensive research on an improvement in productivity of the production of a nitrile rubber having a carboxy group (preferably, production of a nitrile rubber through copolymerization of an α,β-ethylenic unsaturated carboxylic acid ester monomer), especially, that in the hydrogenation reaction step for the carboxy group-containing nitrile rubber. The present inventor has found that the productivity can be appropriately improved by heating the latex of the carboxy group-containing nitrile rubber at the above-described temperature in the state where the pH is adjusted in the range of 8.5 to 12, and performing the hydrogenation reaction in the state where the pH is adjusted to 5 to 8, and have completed the present invention.

In the production method according to the present invention, the pH of the latex of the carboxy group-containing nitrile rubber prepared through the polymerization step can be adjusted to 8.5 to 12 by any method. Examples thereof include a method of adding a hydroxide of an alkali metal such as sodium hydroxide or potassium hydroxide; a carbonate of an alkali metal such as sodium carbonate or potassium carbonate; a hydrogen carbonate salt of an alkali metal such as sodium hydrogen carbonate; ammonia; an organic amine compound such as trimethylamine or triethanolamine; or the like to the latex of the carboxy group-containing nitrile rubber. Among these, a hydroxide of an alkali metal is preferred, and potassium hydroxide is more preferred.

In the heating step, it is sufficient that heating is performed while the pH of the latex of the carboxy group-containing nitrile rubber is in the range of 8.5 to 12. The pH during heating is preferably 8.7 to 12, more preferably 9 to 12. An excessively low or high pH of the latex of the carboxy group-containing nitrile rubber during the heating step reduces the hydrogenation efficiency in the hydrogenation reaction, thus impeding the productivity improving effect.

The heating temperature in the heating step is 50 to 85° C., preferably 55 to 80° C., more preferably 60 to 80° C. An excessively low heating temperature during the heating step reduces the hydrogenation efficiency in the hydrogenation reaction, thus impeding the productivity improving effect. In contrast, an excessively high heating temperature during the heating step reduces not only the hydrogenation efficiency but also the yield of the carboxy group-containing nitrile rubber as a result of aggregation of solids in the latex of the carboxy group-containing nitrile rubber. The heating time in the heating step is preferably 0.5 to 10 hours, more preferably 1 to 8 hours, still more preferably 1 to 6 hours. The hydrogenation efficiency in the hydrogenation reaction can be further enhanced by controlling the heating time during the heating step within this range.

It is preferred that heating be performed under a reduced pressure condition in the heating step when the latex of the carboxy group-containing nitrile rubber is heated in the state where the pH is controlled in the range of 8.5 to 12. Thereby, volatile components, such as residual monomers, which are contained in the latex of the carboxy group-containing nitrile rubber prepared through the polymerization step can also be effectively removed. Although the reduced pressure condition for heating under the reduced pressure condition is not particularly limited, it is preferably a degree of pressure reduction lower than atmospheric pressure by 0.03 MPa to 0.08 MPa (i.e., [(atmospheric pressure)−0.03 MPa] to [(atmospheric pressure)−0.08 MPa)], more preferably a degree of pressure reduction lower than atmospheric pressure by 0.05 to 0.08 MPa (i.e., [(atmospheric pressure)−0.05 MPa] to [(atmospheric pressure)−0.08 MPa]). The heating under a reduced pressure condition may be performed using an evaporator or the like.

In the heating step, the pH of the latex of the carboxy group-containing nitrile rubber may be adjusted to 8.5 to 12, and then the latex may be heated to 50 to 85° C.; or the latex of the carboxy group-containing nitrile rubber may be heated to 50 to 85° C., and then the pH may be adjusted to 8.5 to 12.

<Hydrogenation Reaction Step>

The hydrogenation reaction step in the production method according to the present invention is a step of subjecting the latex of the carboxy group-containing nitrile rubber after heated in the heating step to a hydrogenation reaction in the presence of a hydrogenation catalyst in the state where the pH is adjusted in the range of 5 to 8.

The pH of the latex of the carboxy group-containing nitrile rubber after heated can be adjusted to 5 to 8 by any method. Examples thereof include a method of adding hydrochloric acid, nitric acid, sulfuric acid, or the like.

In the hydrogenation reaction step, it is sufficient that the latex of the carboxy group-containing nitrile rubber after heated in the heating step is heated while the pH is being controlled in the range of 5 to 8. The pH is preferably 6 to 8, more preferably 6 to 7.5. An excessively low or high pH of the latex of the carboxy group-containing nitrile rubber in the hydrogenation reaction step reduces the hydrogenation efficiency in the hydrogenation reaction, thus impeding the productivity improving effect.

In the hydrogenation reaction step in the production method according to the present invention, the hydrogenation reaction is performed by an aqueous layer direct hydrogenation method of hydrogenating the latex of the carboxy group-containing nitrile rubber, which is prepared in the polymerization step and heated in the heating step, in the presence of a hydrogenation catalyst while the form of a latex is kept without generating aggregates.

According to the production method according to the present invention, the latex of the carboxy group-containing nitrile rubber is preliminarily subjected to a heat treatment to heat the latex at 50 to 85° C. in the state where the pH is adjusted in the range of 8.5 to 12, and the latex of the carboxy group-containing nitrile rubber subjected to such a heat treatment is subjected to the hydrogenation reaction in the state where the pH is controlled in the range of 5 to 8. Such a production method enables favorable progression of the hydrogenation reaction even if a relatively small amount of hydrogenation catalyst is used in the hydrogenation reaction.

The hydrogenation catalyst can be any compound which is barely decomposed by water. Specific examples thereof include palladium catalysts such as palladium salts of carboxylic acids such as formic acid, propionic acid, lauric acid, succinic acid, oleic acid, and phthalic acid; chlorides of palladium such as palladium chloride, dichloro(cyclooctadiene)palladium, dichloro(norbonadiene)palladium, and ammonium hexachloropalladate (IV); iodides such as palladium iodide; palladium sulfate dihydrate; and the like. Among these, particularly preferred are palladium salts of carboxylic acid, dichloro(norbonadiene)palladium, and ammonium hexachloropalladate (IV). The amount of the hydrogenation catalyst to be used may be appropriately selected according to the iodine value of the carboxy group-containing hydrogenated nitrile rubber finally prepared. The amount is preferably 500 to 3000 ppm by weight, more preferably 800 to 3000 ppm by weight, particularly preferably 800 to 1300 ppm relative to the carboxy group-containing nitrile rubber components contained in the latex.

The temperature for the hydrogenation reaction is usually 0 to 200° C., preferably 5 to 150° C., more preferably 10 to 100° C. Control of the temperature for the hydrogenation reaction within this range results in a sufficient reaction rate while side reactions are suppressed.

The hydrogen pressure during the hydrogenation reaction is usually 0.10 to 20 MPa, preferably 0.10 to 15 MPa, more preferably 0.11 to 10 MPa. Although not particularly limited, the reaction time is usually 30 minutes to 50 hours. Preferably, the reaction system is first purged with an inert gas such as nitrogen, and then with hydrogen, and the pressure thereof is increased.

After such a hydrogenation reaction in the hydrogenation reaction step is completed, a solid carboxy group-containing hydrogenated nitrile rubber may be obtained through coagulation by salting-out or using an alcohol such as methanol while the hydrogenation catalyst is left as it is in the latex, followed by filtration and drying. In the production method according to the present invention, preferably, the hydrogenation catalyst in the latex is recovered and removed after the hydrogenation reaction in the hydrogenation reaction step is completed. Examples of the method of recovering and removing the hydrogenation catalyst include a method of precipitating the hydrogenation catalyst as an insoluble complex by adding and mixing a complexing agent to and with the latex after the completion of the hydrogenation reaction to complex the hydrogenation catalyst with the complexing agent, and then filtering the insoluble complex through a metal screen. At this time, the latex after the hydrogenation reaction is completed may be subjected to an oxidation treatment to oxidize the reduced catalyst present in the latex before the complexing agent is added or while the complexing agent is being mixed after the addition.

In the production method according to the present invention, the hydrogenation reaction can favorably progress even if a relatively small amount of the hydrogenation catalyst is used in the hydrogenation reaction, thus reducing the amount of the hydrogenation catalyst to be used. As a result, in the production method according to the present invention, the recovery amount (removal amount) during recovery and removal of the hydrogenation catalyst can also be reduced in the case where the hydrogenation catalyst is recovered as an insoluble complex, thus effectively improving the production efficiency.

The complexing agent can be any complexing agent that has complexing action to the metal (such as palladium) included in the hydrogenation catalyst, and generates a water-insoluble complex. Examples thereof include oxime compounds. Because of their strong complex formation ability, preferred are dioxime compounds, and more preferred are $\alpha,\beta$-alkanedione dioximes such as dimethylglyoxime and cyclohexanedione dioxime. Among these, dimethylglyoxime is particularly preferred.

In the production method according to the present invention, a solid carboxy group-containing hydrogenated nitrile rubber can be obtained from the latex of the carboxy group-containing hydrogenated nitrile rubber prepared in the hydrogenation reaction step and optionally subjected to recovery and removal of the hydrogenation catalyst through coagulation by salting-out or an alcohol such as methanol, followed by filtration and drying. In this case, the filtration and drying steps subsequent to the coagulation step may be performed by known methods.

The iodine value of the carboxy group-containing hydrogenated nitrile rubber prepared by the production method according to the present invention is not particularly limited, and may be appropriately selected according to desired properties. The iodine value is preferably 120 or less, more preferably 100 or less, still more preferably 80 or less, particularly preferably 23 or less. The lower limit of the iodine value, although not particularly limited, is usually 3 or more.

The carboxy group-containing hydrogenated nitrile rubber prepared by the production method according to the present invention has a polymer Mooney viscosity (ML1+4, 100° C.) of preferably 10 to 200, more preferably 15 to 150, still more preferably 15 to 100, particularly preferably 30 to 90. Control of the polymer Mooney viscosity within this range results in favorable processability of a cross-linkable rubber composition containing a cross-linking agent and favorable mechanical properties after cross-linking thereof.

<Cross-Linkable Rubber Composition>

The cross-linkable rubber composition according to the present invention comprises a carboxy group-containing hydrogenated nitrile rubber prepared by the production method according to the present invention and a cross-linking agent.

Examples of the cross-linking agent to be used include, but should not be limited to, sulfur-based cross-linking agents, organic peroxide-based cross-linking agents, polyamine-based cross-linking agents, and the like. Preferred are polyamine-based cross-linking agents to provide a cross-linked rubber having further enhanced permanent compression set resistance.

The polyamine-based cross-linking agent can be any compound having two or more amino groups or any compound which turns into a compound having two or more amino groups during cross-linking. Preferred are compounds having hydrogen atoms of an aliphatic hydrocarbon or an aromatic hydrocarbon which are substituted by amino groups or hydrazide structures (a structure represented by —$CONHNH_2$ where CO represents a carbonyl group), and those which turn into such compounds during cross-linking.

Specific examples of the polyamine-based cross-linking agents include aliphatic polyvalent amines such as hexamethylenediamine, hexamethylenediamine carbamate, N,N-dicinnamylidene-1,6-hexanediamine, tetramethylenepentamine, and hexamethylenediamine cinnamaldehyde adducts; aromatic polyvalent amines such as 4,4-methylenedianiline, m-phenylenediamine, 4,4-diaminodiphenyl ether, 3,4-diaminodiphenyl ether, 4,4-(m-phenylenediisopropylidene)dianiline, 4,4-(p-phenylenediisopropylidene)dianiline, 2,2-bis[4-(4-amino phenoxy)phenyl]propane, 4,4-diaminobenzanilide, 4,4-bis(4-aminophenoxy)biphenyl, m-xylylenediamine, p-xylylenediamine, and 1,3,5-benzenetriamine; polyvalent hydrazides such as dihydrazide isophthalate, dihydrazide terephthalate, dihydrazide phthalate, dihydrazide 2,6-naphthalenedicarboxylate, dihydrazide naphthalate, dihydrazide oxalate, dihydrazide malonate, dihydrazide succinate, dihydrazide glutamate, dihydrazide adipate, dihydrazide pimelate, dihydrazide suberate, dihydrazide azelate, dihydrazide sebacate, dihydrazide brassylate, dihydrazide dodecanedioate, dihydrazide acetonedicarboxylate, dihydrazide fumarate, dihydrazide maleate, dihydrazide itaconate, dihydrazide trimellitate, dihydrazide 1,3,5-benzenetricarboxylate, dihydrazide aconitate, and dihydrazide pyromellitate; and the like. Among these, preferred are aliphatic polyvalent amines and aromatic polyvalent amines, more preferred are hexamethylenediamine carbamate and 2,2-bis[4-(4-aminophenoxy)phenyl]propane, and particularly preferred is hexamethylenediamine carbamate to provide a further remarkable effect of the present invention.

Although not particularly limited, the content of the cross-linking agent in the cross-linkable rubber composition according to the present invention is preferably 0.1 to 10 parts by weight, more preferably 0.2 to 5 parts by weight relative to 100 parts by weight of the carboxy group-containing hydrogenated nitrile rubber.

It is also preferred that the cross-linkable rubber composition further contain a basic cross-linking accelerator when a polyamine-based cross-linking agent is used as a cross-linking agent.

Specific examples of the basic cross-linking accelerator include basic cross-linking accelerators having a cyclic amidine structure, such as 1,8-diazabicyclo[5,4,0]undecene-7 (hereinafter, abbreviated to "DBU" in some cases), 1,5-diazabicyclo[4,3,0]nonene-5 (hereinafter, abbreviated to "DBN" in some cases), 1-methylimidazole, 1-ethylimidazole, 1-phenylimidazole, 1-benzylimidazole, 1,2-dimethylimidazole, 1-ethyl-2-methylimidazole, 1-methoxyethylimidazole, 1-phenyl-2-methylimidazole, 1-benzyl-2-methylimidazole, 1-methyl-2-phenylimidazole, 1-methyl-2-benzylimidazole, 1,4-dimethylimidazole, 1,5-dimethylimidazole, 1,2,4-trimethylimidazole, 1,4-dimethyl-2-ethylimidazole, 1-methyl-2-methoxyimidazole, 1-methyl-2-ethoxyimidazole, 1-methyl-4-methoxyimidazole, 1-methyl-2-methoxyimidazole, 1-ethoxymethyl-2-methylimidazole, 1-methyl-4-nitroimidazole, 1,2-dimethyl-5-nitroimidazole, 1,2-dimethyl-5-aminoimidazole, 1-methyl-4-(2-aminoethyl)imidazole, 1-methylbenzimidazole, 1-methyl-2-benzylbenzimidazole, 1-methyl-5-nitrobenzimidazole, 1-methylimidazoline, 1,2-dimethylimidazoline, 1,2,4-trimethylimidazoline, 1,4-dimethyl-2-ethylimidazoline, 1-methyl-phenylimidazoline, 1-methyl-2-benzylimidazoline, 1-methyl-2-ethoxyimidazoline, 1-methyl-2-heptylimidazoline, 1-methyl-2-undecylimidazoline, 1-methyl-2-heptadecylimidazoline, 1-methyl-2-ethoxymethylimidazoline, and 1-ethoxymethyl-2-methylimidazoline; guanidine-based basic cross-linking accelerators such as tetramethylguanidine, tetraethylguanidine, diphenylguanidine, 1,3-di-orthotolylguanidine, and orthotolylbiguanide; aldehydeamine-based basic cross-linking accelerators such as n-butylaldehydeaniline and acetaldehyde ammonia; dicycloalkylamines such as dicyclopentylamine, dicyclohexylamine, and dicycloheptylamine; secondary amine-based basic cross-linking accelerators such as N-methylcyclopentylamine, N-butylcyclopentylamine, N-heptylcyclopentylamine, N-octylcyclopentylamine, N-ethylcyclohexylamine, N-butylcyclohexylamine, N-heptylcyclohexylamine, N-octylcyclooctylamine, N-hydroxymethylcyclopentylamine, N-hydroxybutylcyclohexylamine, N-methoxyethylcyclopentylamine, N-ethoxybutylcyclohexylamine, N-methoxycarbonylbutylcyclopentylamine, N-methoxycarbonylheptylcyclohexylamine, N-aminopropylcyclopentylamine, N-aminoheptylcyclohexylamine, di(2-chlorocyclopentyl)amine, and di(3-chlorocyclopentyl)amine; and the like. Among these, preferred are guanidine-based basic cross-linking accelerators, secondary amine-based basic cross-linking accelerators, and basic cross-linking accelerators having a cyclic amidine structure, more preferred are basic cross-linking accelerators having a cyclic amidine structure, still more preferred are 1,8-diazabicyclo[5,4,0]undecene-7 and 1,5-diazabicyclo[4,3,0]nonene-5, and particularly preferred is 1,8-diazabicyclo[5,4,0]undecene-7. The basic cross-linking accelerators having a cyclic amidine structure may form salts with organic carboxylic acids or alkyl phosphoric acids. The secondary amine-based basic cross-linking accelerators may be those mixed with an alcohol such as an alkylene glycol or an alkyl alcohol having 5 to 20 carbon atoms, and may further contain an inorganic acid and/or an organic acid. In addition, the secondary amine-based basic cross-linking accelerators each may form salt with the inorganic acid and/or the organic acid, and may further form complex with the alkylene glycol.

The amount of the basic cross-linking accelerator compounded in the cross-linkable rubber composition according to the present invention is preferably 0.1 to 20 parts by weight, more preferably 0.2 to 15 parts by weight, still more preferably 0.5 to 10 parts by weight relative to 100 parts by weight of the carboxy group-containing hydrogenated nitrile rubber.

The cross-linkable rubber composition according to the present invention may also contain other compounding agents usually used in the field of rubber processing. Examples of such compounding agents include reinforcing agents, fillers, photostabilizers, scorch retardants, plasticizers, processing aids, lubricants, tackifiers, lubricants, flame retardants, acid acceptors, antifungal agents, antistatic agents, colorants, silane coupling agents, cross-linking aids, co-cross-linking agents, cross-linking accelerators, cross-linking retarders, foaming agents, and the like. These compounding agents can be used in an appropriately compounding amount according to the purpose of compounding.

Although not particularly limited, the plasticizer to be used can be trimellitic acid-based plasticizers and ether ester-based plasticizers. Specific examples thereof include tri-2-ethylhexyl trimellitate, isononyl trimellitate ester, bis[2-(2-butoxyethoxy)ethyl] adipate, diheptanoate, di-2-ethylhexanoate, didecanoate, and the like. These can be used alone or in combination.

Furthermore, the cross-linkable rubber composition according to the present invention may contain rubbers other than the carboxy group-containing hydrogenated nitrile rubber described above in the range not impairing the effects of the present invention.

Examples of such rubbers include acrylic rubbers, ethylene-acrylic acid copolymer rubbers, fluorocarbon rubbers, styrene-butadiene copolymer rubbers, polybutadiene rubbers, ethylene-propylene copolymer rubbers, ethylene-propylene-diene ternary copolymer rubbers, epichlorohydrin rubbers, urethane rubbers, chloroprene rubbers, silicone rubbers, fluorosilicone rubbers, chlorosulfonated polyethylene rubbers, natural rubbers, polyisoprene rubbers, and the like.

The amount of the rubbers other than the carboxy group-containing hydrogenated nitrile rubber compounded in the cross-linkable rubber composition is preferably 30 parts by weight or less, more preferably 20 parts by weight or less, still more preferably 10 parts by weight or less relative to 100 parts by weight of the carboxy group-containing hydrogenated nitrile rubber.

The cross-linkable rubber composition according to the present invention is prepared by mixing the above-mentioned components preferably in a non-aqueous system. The cross-linkable rubber composition according to the present invention can be prepared by any method. Usually, the cross-linkable rubber composition according to the present invention can be prepared by primarily kneading the components excluding the cross-linking agent and agents unstable to heat such as a co-cross-linking agent with a mixer such as a Banbury mixer, an intermixer, a kneader, or the like, transferring the kneaded product to an open roll mill, and adding the cross-linking agent and agents unstable to heat such as the cross-linking accelerator thereto to perform secondary kneading. Primary kneading is performed usually at 10 to 200° C., preferably at 30 to 180° C. for 1 minute to 1 hour, preferably 1 minute to 30 minutes, and secondary kneading is performed usually at 10 to 90° C., preferably at 20 to 60° C. for 1 minute to 1 hour, preferably 1 minute to 30 minutes.

<Cross-Linked Rubber>

The cross-linked rubber according to the present invention is famed by cross-linking the cross-linkable rubber composition according to the present invention above.

The cross-linked rubber according to the present invention can be produced by molding the cross-linkable rubber composition according to the present invention using a molding machine suited for a desired shape, such as an extruder, an injection molding machine, a compressor, a roll, or the like, and performing a cross-linking reaction by heating to fix the shape of the product as a cross-linked product. In this case, the cross-linkable rubber composition may be preliminarily molded and then cross-linked, or may be cross-linked simultaneously with molding. The molding temperature is usually 10 to 200° C., preferably 25 to 120° C. The cross-linking temperature is usually 100 to 200° C., preferably 130 to 190° C., and the cross-linking time is usually 1 minute to 24 hours, preferably 2 minutes to 1 hour.

Depending on the shape, the size, and the like thereof, the inside of the cross-linked rubber may not be sufficiently cross-linked even if the surface thereof is cross-linked. For this reason, the cross-linked rubber may be further heated for secondary cross-linking.

A general method used in cross-linking of rubber, such as press heating, steam heating, oven heating, hot air heating, or the like, can be appropriately selected for the heating method.

The cross-linked rubber according to the present invention thus prepared is obtained using the carboxy group-containing hydrogenated nitrile rubber prepared by the production method according to the present invention described above, thus resulting in properties derived from the carboxy group-containing hydrogenated nitrile rubber, that is, high oil resistance, mechanical properties, and permanent compression set resistance. Utilizing such properties, the cross-linked rubber according to the present invention thus prepared can be suitably used in a variety of applications.

EXAMPLES

Hereinafter, the present invention will be specifically described by way of Examples and Comparative Examples. The tam "parts" is weight-based unless otherwise specified. Tests and evaluations were performed as follows.

<Amount of Residual Molecular Weight Modifier Having Mercapto Group>

5 ml of N/10 ferrous sulfate solution was added to 150 ml of a methyl ethyl ketone/isopropyl alcohol (75 wt %/25 wt %) mixed solution. In the next step, 5 g of a latex of a carboxy group-containing hydrogenated nitrile rubber was added to the solution, and rubber components in the latex were dissolved. 2 ml of 28 wt % ammonia solution was added to the resulting solution to prepare a test solution. Using Hiranuma COM-7 potentiometric titrator, the test solution was titrated with an N/200 silver nitrate solution to determine the amount of residual molecular weight modifier having a mercapto group. The amount of the residual molecular weight modifier having a mercapto group was determined as an amount relative to 100 wt % of the carboxy group-containing hydrogenated nitrile rubber component.

<Composition of Carboxy Group-Containing Hydrogenated Nitrile Rubber>

The proportions of the monomer units forming the carboxy group-containing hydrogenated nitrile rubber were measured by the following method.

In other words, the proportion of mono-n-butyl maleate units was determined as follows: 100 ml of 2-butanone was added to 0.2 g of 2 mm-square carboxy group-containing nitrile rubber before a hydrogenation reaction, and was stirred for 4 hours. 20 ml of Ethanol and 10 ml of water were added. Under stirring, the resulting solution was titrated with a 0.02 N hydrous ethanol solution of potassium hydroxide at room temperature using thymolphthalein as an indicator to determine the molar number of carboxy groups relative to 100 g of the carboxy group-containing nitrile rubber. The proportion of mono-n-butyl maleate units was calculated by converting the resulting molar number into the amount of mono-n-butyl maleate units.

The proportions of 1,3-butadiene units and saturated butadiene units were calculated by measuring the iodine value (according to JIS K6235) before and after the hydrogenation reaction of the carboxy group-containing nitrile rubber.

In accordance with JIS K6384, the proportion of acrylonitrile units was calculated by measuring the nitrogen content in the carboxy group-containing hydrogenated nitrile rubber by the Kjeldahl method.

The proportion of n-butyl acrylate units was calculated as the balance of the monomer units above.

<Iodine Value>

The iodine value of the carboxy group-containing hydrogenated nitrile rubber was calculated in accordance with JIS K6235.

Example 1

180 Parts of deionized water, 25 parts of 10 wt % sodium dodecylbenzenesulfonate aqueous solution, 5 parts of a sodium salt of 10 wt % naphthalenesulfonic acid-formalin condensate, 21 parts of acrylonitrile, 6 parts of mono-n-butyl maleate, 31 parts of n-butyl acrylate, and 0.6 parts of t-dodecylmercaptan (molecular weight modifier having a mercapto group) were sequentially placed into a metal bottle. The gas inside thereof was purged with nitrogen 3 times, and 42 parts of 1,3-butadiene was added. The metal bottle was kept at 5° C., and 0.1 parts of cumene hydroperoxide (polymerization initiator), and appropriate amounts of a reducing agent, a chelating agent, and a builder were added. A polymerization reaction was performed for 16 hours while the metal bottle was being rotated. Subsequently, when the polymerization conversion ratio reached 85%, 4 parts of 2.5 wt % 2,2,6,6-tetramethylpiperidine-1-oxyl aqueous solution (polymerization terminator) was added to terminate the polymerization reaction. A latex of a carboxy group-containing nitrile rubber was thereby prepared. The latex of the carboxy group-containing nitrile rubber had a pH of 3.0.

An appropriate amount of 1 wt % potassium hydroxide aqueous solution was added to the latex of the carboxy group-containing nitrile rubber, and was stirred for 1 hour to adjust the pH of the latex of the carboxy group-containing nitrile rubber to 9.0. The latex was subjected to a heat treatment under a reduced pressure condition in the state where the pH was adjusted to 9.0. Specifically, using a rotary evaporator (water temperature: 80° C.), in the state where the pH was adjusted to 9.0, the latex of the carboxy group-containing nitrile rubber was heated for 2 hours under a reduced pressure condition of the degree of pressure reduction lower than atmospheric pressure by 0.05 MPa. Thereby, the latex was heated and residual monomers were removed.

In the next step, an appropriate amount of 1 wt % sulfuric acid aqueous solution was added to the latex of the carboxy group-containing nitrile rubber after heating, and was stirred for 1 hour to adjust the pH of the latex of the carboxy group-containing nitrile rubber to 6.3, and a hydrogenation reaction was performed. Specifically, the latex prepared above and a palladium catalyst (a mixed solution of 1 wt % palladium acetate acetone solution and deionized water having an equivalent weight) and deionized water in an amount to give a solid content of 15 wt % in the latex of the carboxy group-containing nitrile rubber were added to an autoclave such that the palladium content was 1000 ppm by weight relative to the dry weight of the rubber contained in the latex of the carboxy group-containing nitrile rubber. In the state where the pH was adjusted to 6.3, the hydrogenation reaction was performed at a hydrogen pressure of 3 MPa and a temperature of 50° C. for 6 hours to prepare a latex of a carboxy group-containing hydrogenated nitrile rubber (N1).

In the next step, dimethylglyoxime (complexing agent) in an amount of 2.5 molar equivalents relative to palladium used in the hydrogenation reaction was added to 1 L of the latex of the carboxy group-containing hydrogenated nitrile rubber (N1), and was stirred at 80° C. for 3 hours to precipitate palladium as an insoluble complex. In the next step, 1 L of the latex containing the insoluble complex was continuously poured onto an 80-mesh metal screen to remove the insoluble complex. As a result, in Example 1, the insoluble complex in 1 L of the latex could be removed without clogging of the metal screen. For the latex of the carboxy group-containing hydrogenated nitrile rubber (N1) after removal of palladium as the hydrogenation catalyst, the amount of residual molecular weight modifier having a mercapto group was measured according to the method above. The measurement was 140 ppm by weight.

In the next step, the latex after removal of palladium as the hydrogenation catalyst was coagulated by adding a 2-fold volume of methanol to the latex, and was dried in vacuum at 60° C. for 12 hours to prepare a solid carboxy group-containing hydrogenated nitrile rubber (N1). The carboxy group-containing hydrogenated nitrile rubber (N1) had an iodine value of 20, and had a composition consisting of 21 wt % of acrylonitrile units, 39 wt % of 1,3-butadiene units (including hydrogenated units), 5 wt % of mono-n-butyl maleate units, and 35 wt % of n-butyl acrylate units.

Example 2

A latex of a carboxy group-containing hydrogenated nitrile rubber (N2) was prepared in the same manner as in Example 1 except that the latex of the carboxy group-containing nitrile rubber was subjected to a heat treatment under the reduced pressure condition in the state where the pH was adjusted to 11.0.

In the next step, as in Example 1, dimethylglyoxime was added to 1 L of the latex of the carboxy group-containing hydrogenated nitrile rubber (N2) to form insoluble complex, and the insoluble complex was removed using an 80-mesh metal screen. Also in Example 2, the insoluble complex in 1 L of the latex could be removed without clogging of the metal screen.

For the latex of the carboxy group-containing hydrogenated nitrile rubber (N2) after removal of palladium as the hydrogenation catalyst, the amount of residual molecular weight modifier having a mercapto group was measured according to the method above. The measurement was 130 ppm by weight. In the next step, the latex was coagulated and dried in the same manner as in Example 1 to prepare a solid carboxy group-containing hydrogenated nitrile rubber (N2). The iodine value and the composition are as shown in Table 1.

Example 3

A latex of a carboxy group-containing hydrogenated nitrile rubber (N3) was prepared in the same manner as in Example 1 except that the latex of the carboxy group-containing nitrile rubber was subjected to a heat treatment under the reduced pressure condition in the state where the pH was adjusted to 12.0.

In the next step, as in Example 1, dimethylglyoxime was added to 1 L of the latex of the carboxy group-containing hydrogenated nitrile rubber (N3) to form an insoluble complex, and the insoluble complex was removed using an 80-mesh metal screen. Also in Example 3, the insoluble complex in 1 L of the latex could be removed without clogging of the metal screen.

For the latex of the carboxy group-containing hydrogenated nitrile rubber (N3) after removal of palladium as the hydrogenation catalyst, the amount of residual molecular weight modifier having a mercapto group was measured according to the method above. The measurement was 140 ppm by weight. In the next step, the latex was coagulated and dried in the same manner as in Example 1 to prepare a solid carboxy group-containing hydrogenated nitrile rubber (N3). The iodine value and the composition are as shown in Table 1.

Example 4

180 Parts of deionized water, 25 parts of 10 wt % sodium dodecylbenzenesulfonate aqueous solution, 5 parts of a sodium salt of a 10 wt % naphthalenesulfonic acid-formalin condensate, 35 parts of acrylonitrile, 6 parts of mono-n-butyl maleate, and 0.75 parts of t-dodecylmercaptan (molecular weight modifier having a mercapto group) were sequentially placed into a metal bottle. The gas inside thereof was purged with nitrogen 3 times, and 59 parts of 1,3-butadiene was added. The metal bottle was kept at 5° C., 0.1 parts of cumene hydroperoxide (polymerization initiator) and appropriate amounts of a reducing agent, a chelating agent, and a builder were added. A polymerization reaction was performed for 16 hours while the metal bottle was being rotated. Subsequently, when the polymerization conversion ratio reached 85%, 4 parts of 2.5 wt % 2,2,6,6-tetramethylpiperidine-1-oxyl aqueous solution (polymerization terminator) was added to terminate the polymerization reaction. A latex of a carboxy group-containing nitrile rubber was thereby prepared. The latex of the carboxy group-containing nitrile rubber had a pH of 2.8.

An appropriate amount of 1 wt % potassium hydroxide aqueous solution was added to the latex of the carboxy group-containing nitrile rubber, and was stirred for 1 hour to adjust the pH of the latex of the carboxy group-containing nitrile rubber to 12.0. The latex was subjected to a heat treatment under the reduced pressure condition in the state where the pH was adjusted to 12.0. Specifically, using a rotary evaporator (water temperature: 80° C.), in the state where the pH was adjusted to 12.0, the latex of the carboxy group-containing nitrile rubber was heated for 3 hours under a reduced pressure condition of the degree of pressure reduction lower than atmospheric pressure by 0.05 MPa. Thereby, the latex was heated and residual monomers were removed.

In the next step, an appropriate amount of 1 wt % sulfuric acid aqueous solution was added to the latex of the carboxy group-containing nitrile rubber after heating, and was stirred for 1 hour to adjust the pH of the latex of the carboxy group-containing nitrile rubber to 6.5, and a hydrogenation reaction was performed. Specifically, the latex prepared above and a palladium catalyst (a mixed solution of 1 wt % palladium acetate acetone solution and deionized water having an equivalent weight) and deionized water in an amount to give a solid content of 15 wt % in the latex of the carboxy group-containing nitrile rubber were added to an autoclave such that the palladium content was 1000 ppm by weight relative to the dry weight of the rubber contained in the latex of the carboxy group-containing nitrile rubber. In the state where the pH was adjusted to 6.5, the hydrogenation reaction was performed at a hydrogen pressure of 3 MPa and a temperature of 50° C. for 6 hours to prepare a latex of a carboxy group-containing hydrogenated nitrile rubber (N4).

In the next step, dimethylglyoxime (complexing agent) in an amount of 2.5 molar equivalents relative to palladium used in the hydrogenation reaction was added to 1 L of the latex of the carboxy group-containing hydrogenated nitrile rubber (N4), and was stirred at 80° C. for 3 hours to precipitate palladium as an insoluble complex. In the next step, 1 L of the latex containing the insoluble complex was continuously poured onto an 80-mesh metal screen to remove the insoluble complex. As a result, in Example 4, the insoluble complex in 1 L of the latex could be removed without clogging of the metal screen. For the latex of the carboxy group-containing hydrogenated nitrile rubber (N4) after removal of palladium as the hydrogenation catalyst, the amount of residual molecular weight modifier having a mercapto group was measured according to the method above. The measurement was 200 ppm by weight.

In the next step, the latex was coagulated and dried in the same manner as in Example 1 to prepare a solid carboxy group-containing hydrogenated nitrile rubber (N4). The iodine value and the composition are as shown in Table 1.

Example 5

A latex of a carboxy group-containing hydrogenated nitrile rubber (N5) was prepared in the same manner as in Example 4 except that the hydrogenation reaction of the latex of the carboxy group-containing nitrile rubber was performed in the state where the pH was adjusted to 7.3.

In the next step, as in Example 4, dimethylglyoxime was added to 1 L of the latex of the carboxy group-containing hydrogenated nitrile rubber (N5) to form an insoluble complexing, and the insoluble complex was removed using an 80-mesh metal screen. Also in Example 5, the insoluble complex in 1 L of the latex could be removed without clogging of the metal screen.

For the latex of the carboxy group-containing hydrogenated nitrile rubber (N5) after removal of palladium as the hydrogenation catalyst, the amount of residual molecular weight modifier having a mercapto group was measured according to the method above. The measurement was 200 ppm by weight. In the next step, the latex was coagulated and dried in the same manner as in Example 4 to prepare a solid carboxy group-containing hydrogenated nitrile rubber (N5). The iodine value and the composition are as shown in Table 1.

Example 6

A latex of a carboxy group-containing hydrogenated nitrile rubber (N6) was prepared in the same manner as in Example 3 except that the latex of the carboxy group-containing nitrile rubber was subjected to the heat treatment under the reduced pressure condition using a rotary evaporator (water temperature: 60° C.).

In the next step, as in Example 3, dimethylglyoxime was added to 1 L of the latex of the carboxy group-containing hydrogenated nitrile rubber (N6) to form insoluble complex, and the insoluble complex was removed using an 80-mesh metal screen. Also in Example 6, the insoluble complex in 1 L of the latex could be removed without clogging of the metal screen.

For the latex of the carboxy group-containing hydrogenated nitrile rubber (N6) after removal of palladium as the hydrogenation catalyst, the amount of residual molecular weight modifier having a mercapto group was measured according to the method above. The measurement was 150 ppm by weight. In the next step, the latex was coagulated and dried in the same manner as in Example 3 to prepare a solid carboxy group-containing hydrogenated nitrile rubber (N6). The iodine value and the composition are as shown in Table 1.

Comparative Example 1

A latex of a carboxy group-containing hydrogenated nitrile rubber (N7) was prepared in the same manner as in Example 1 except that the latex of the carboxy group-containing nitrile rubber was subjected to a heat treatment under the reduced pressure condition at a pH of 3.0 as it was. In Comparative Example 1, the pH of the latex before the hydrogenation reaction was adjusted using a 2.5 wt % potassium hydroxide aqueous solution.

In the next step, as in Example 1, dimethylglyoxime was added to 1 L of the latex of the carboxy group-containing hydrogenated nitrile rubber (N7) to form an insoluble complex, and the insoluble complex was removed using an 80-mesh metal screen. Also in Comparative Example 1, the insoluble complex in 1 L of the latex could be removed without clogging of the metal screen.

For the latex of the carboxy group-containing hydrogenated nitrile rubber (N7) after removal of palladium as the hydrogenation catalyst, the amount of residual molecular weight modifier having a mercapto group was measured according to the method above. The measurement was 150 ppm by weight. In the next step, the latex was coagulated and dried in the same manner as in Example 1 to prepare a solid carboxy group-containing hydrogenated nitrile rubber (N7). The iodine value and the composition are as shown in Table 1.

Comparative Example 2

A latex of a carboxy group-containing hydrogenated nitrile rubber (N8) was prepared in the same manner as in Comparative Example 1 except that the amount of the palladium catalyst used in the hydrogenation reaction was 1500 ppm by weight in terms of palladium content. In Comparative Example 2, the pH of the latex before the hydrogenation reaction was adjusted using a 2.5 wt % potassium hydroxide aqueous solution.

In the next step, as in Example 1, dimethylglyoxime was added to 1 L of the latex of the carboxy group-containing hydrogenated nitrile rubber (N8) to form insoluble complex, and the insoluble complex was removed using an 80-mesh metal screen. In Comparative Example 2, the metal screen was clogged during the treatment of 1 L of the latex, and exchange of the metal screen was needed.

For the latex of the carboxy group-containing hydrogenated nitrile rubber (N8) after removal of palladium as the hydrogenation catalyst, the amount of residual molecular weight modifier having a mercapto group was measured according to the method above. The measurement was 150 ppm by weight. In the next step, the latex was coagulated and dried in the same manner as in Example 1 to prepare a solid carboxy group-containing hydrogenated nitrile rubber (N8). The iodine value and the composition are as shown in Table 1.

Comparative Example 3

A latex of a carboxy group-containing hydrogenated nitrile rubber (N9) was prepared in the same manner as in Example 1 except that the latex of the carboxy group-containing nitrile rubber was subjected to a heat treatment under the reduced pressure condition in the state where the pH was adjusted to 12.5.

In the next step, as in Example 1, dimethylglyoxime was added to 1 L of the latex of the carboxy group-containing hydrogenated nitrile rubber (N9) to form an insoluble complex, and the insoluble complex was removed using an 80-mesh metal screen. Also in Comparative Example 3, the insoluble complex in 1 L of the latex could be removed without clogging of the metal screen.

For the latex of the carboxy group-containing hydrogenated nitrile rubber (N9) after removal of palladium as the hydrogenation catalyst, the amount of residual molecular weight modifier having a mercapto group was measured according to the method above. The measurement was 140 ppm by weight. In the next step, the latex was coagulated and dried in the same manner as in Example 1 to prepare a solid carboxy group-containing hydrogenated nitrile rubber (N9). The iodine value and the composition are as shown in Table 1.

Comparative Example 4

A latex of a carboxy group-containing hydrogenated nitrile rubber (N10) was prepared in the same manner as in Example 4 except that the latex of the carboxy group-containing nitrile rubber was subjected to a heat treatment under the reduced pressure condition at a pH of 2.8 as it was.

In the next step, as in Example 4, dimethylglyoxime was added to 1 L of the latex of the carboxy group-containing hydrogenated nitrile rubber (N10) to form an insoluble complex, and the insoluble complex was removed using an 80-mesh metal screen. Also in Comparative Example 4, the insoluble complex in 1 L of the latex could be removed without clogging of the metal screen.

For the latex of the carboxy group-containing hydrogenated nitrile rubber (N10) after removal of palladium as the hydrogenation catalyst, the amount of residual molecular weight modifier having a mercapto group was measured according to the method above. The measurement was 220 ppm by weight. In the next step, the latex was coagulated and dried in the same manner as in Example 4 to prepare a solid carboxy group-containing hydrogenated nitrile rubber (N10). The iodine value and the composition are as shown in Table 1.

Comparative Example 5

A latex of a carboxy group-containing hydrogenated nitrile rubber (N11) was prepared in the same manner as in Example 4 except that the latex of the carboxy group-containing nitrile rubber was subjected to a heat treatment under the reduced pressure condition in the state where the pH was adjusted to 7.0 and the hydrogenation reaction of the latex of the carboxy group-containing nitrile rubber was performed in the state where the pH was adjusted to 7.0.

In the next step, as in Example 4, dimethylglyoxime was added to 1 L of the latex of the carboxy group-containing hydrogenated nitrile rubber (N11) to form an insoluble complex, and the insoluble complex was removed using an 80-mesh metal screen. Also in Comparative Example 5, the insoluble complex in 1 L of the latex could be removed without clogging of the metal screen.

For the latex of the carboxy group-containing hydrogenated nitrile rubber (N11) after removal of palladium as the hydrogenation catalyst, the amount of residual molecular weight modifier having a mercapto group was measured according to the method above. The measurement was 210 ppm by weight. In the next step, the latex was coagulated and dried in the same manner as in Example 4 to prepare a solid carboxy group-containing hydrogenated nitrile rubber (N11). The iodine value and the composition are as shown in Table 1.

Comparative Example 6

A latex of a carboxy group-containing hydrogenated nitrile rubber (N12) was prepared in the same manner as in Example 4 except that the latex of the carboxy group-containing nitrile rubber was subjected to a heat treatment under the reduced pressure condition in the state where the pH was adjusted to 12.0 and the hydrogenation reaction of the latex of the carboxy group-containing nitrile rubber was performed in the state where the pH was adjusted to 4.0.

In the next step, as in Example 4, dimethylglyoxime was added to 1 L of the latex of the carboxy group-containing hydrogenated nitrile rubber (N12) to form an insoluble complex, and the insoluble complex was removed using an 80-mesh metal screen. Also in Comparative Example 6, the insoluble complex in 1 L of the latex could be removed without clogging of the metal screen.

For the latex of the carboxy group-containing hydrogenated nitrile rubber (N12) after removal of palladium as the hydrogenation catalyst, the amount of residual molecular weight modifier having a mercapto group was measured according to the method above. The measurement was 200 ppm by weight. In the next step, the latex was coagulated and dried in the same manner as in Example 4 to prepare a solid carboxy group-containing hydrogenated nitrile rubber (N12). The iodine value and the composition are as shown in Table 1.

Comparative Example 7

A latex of a carboxy group-containing hydrogenated nitrile rubber (N13) was prepared in the same manner as in Example 4 except that the latex of the carboxy group-containing nitrile rubber was subjected to a heat treatment under the reduced pressure condition in the state where the pH was adjusted to 12.0 and the hydrogenation reaction of the latex of the carboxy group-containing nitrile rubber was performed in the state where the pH was adjusted to 9.0.

In the next step, as in Example 4, dimethylglyoxime was added to 1 L of the latex of the carboxy group-containing hydrogenated nitrile rubber (N13) to form an insoluble complex, and the insoluble complex was removed using an 80-mesh metal screen. Also in Comparative Example 7, the insoluble complex in 1 L of the latex could be removed without clogging of the metal screen.

For the latex of the carboxy group-containing hydrogenated nitrile rubber (N13) after removal of palladium as the hydrogenation catalyst, the amount of residual molecular weight modifier having a mercapto group was measured according to the method above. The measurement was 200 ppm by weight. In the next step, the latex was coagulated and dried in the same manner as in Example 4 to prepare a solid carboxy group-containing hydrogenated nitrile rubber (N13). The iodine value and the composition are as shown in Table 1.

Comparative Example 8

A latex of a carboxy group-containing hydrogenated nitrile rubber (N14) was prepared in the same manner as in Example 4 except that the latex of the carboxy group-containing nitrile rubber was subjected to a heat treatment under the reduced pressure condition in the state where the pH was adjusted to 12.0 and the hydrogenation reaction of the latex of the carboxy group-containing nitrile rubber was performed in the state where the pH was adjusted to 12.0.

In the next step, as in Example 4, dimethylglyoxime was added to 1 L of the latex of the carboxy group-containing hydrogenated nitrile rubber (N14) to form an insoluble complex, and the insoluble complex was removed using an 80-mesh metal screen. Also in Comparative Example 8, the insoluble complex in 1 L of the latex could be removed without clogging of the metal screen.

For the latex of the carboxy group-containing hydrogenated nitrile rubber (N14) after removal of palladium as the hydrogenation catalyst, the amount of residual molecular weight modifier having a mercapto group was measured according to the method above. The measurement was 200 ppm by weight. In the next step, the latex was coagulated and dried in the same manner as in Example 4 to prepare a solid carboxy group-containing hydrogenated nitrile rubber (N14). The iodine value and the composition are as shown in Table 1.

TABLE 1

|  |  | Example 1 | Example 2 | Example 3 | Example 4 | Example 5 | Example 6 | Comparative Example 1 |
|---|---|---|---|---|---|---|---|---|
| Conditions for production | pH after polymerization | 3.0 | 3.0 | 3.0 | 2.8 | 2.8 | 3.0 | 3.0 |
| | pH during heat treatment | 9.0 | 11.0 | 12.0 | 12.0 | 12.0 | 12.0 | 3.0 |
| | Heating temperature (° C.) | 80 | 80 | 80 | 80 | 80 | 60 | 80 |
| | pH during hydrogenation reaction | 6.3 | 6.3 | 6.3 | 6.5 | 7.3 | 6.3 | 6.3 |
| | Amount of palladium catalyst (ppm by weight) | 1,000 | 1,000 | 1,000 | 1,000 | 1,000 | 1,000 | 1,000 |
| Rubber composition/ Iodine value | Acrylonitrile unit content (wt %) | 21 | 21 | 21 | 36 | 36 | 21 | 21 |
| | Mono-n-butyl maleate unit content (wt %) | 5 | 5 | 5 | 4 | 4 | 5 | 5 |
| | 1,3-Butadiene unit content (including saturated units) (wt %) | 39 | 39 | 39 | 60 | 60 | 39 | 39 |
| | n-Butyl acrylate unit content (wt %) | 35 | 35 | 35 | — | — | 35 | 35 |
| | Iodine value | 20 | 16 | 17 | 10 | 11 | 18 | 25 |
| Amount of residual molecular weight modifier having mercapto group (ppm by weight) | | 140 | 130 | 140 | 200 | 200 | 150 | 150 |
| Clogging of metal screen during removal of palladium catalyst | | none | none | none | none | none | none | none |

|  |  | Comparative Example 2 | Comparative Example 3 | Comparative Example 4 | Comparative Example 5 | Comparative Example 6 | Comparative Example 7 | Comparative Example 8 |
|---|---|---|---|---|---|---|---|---|
| Conditions for production | pH after polymerization | 3.0 | 3.0 | 2.8 | 2.8 | 2.8 | 2.8 | 2.8 |
| | pH during heat treatment | 3.0 | 12.5 | 2.8 | 7.0 | 12.0 | 12.0 | 12.0 |
| | Heating temperature (° C.) | 80 | 80 | 80 | 80 | 80 | 80 | 80 |
| | pH during hydrogenation reaction | 6.3 | 6.3 | 6.5 | 7.0 | 4.0 | 9.0 | 12.0 |
| | Amount of palladium catalyst (ppm by weight) | 1,500 | 1,000 | 1,000 | 1,000 | 1,000 | 1,000 | 1,000 |
| Rubber composition/ Iodine value | Acrylonitrile unit content (wt %) | 21 | 21 | 36 | 36 | 36 | 36 | 36 |
| | Mono-n-butyl maleate unit content (wt %) | 5 | 5 | 4 | 4 | 4 | 4 | 4 |
| | 1,3-Butadiene unit content (including saturated units) (wt %) | 39 | 39 | 60 | 60 | 60 | 60 | 60 |
| | n-Butyl acrylate unit content (wt %) | 35 | 35 | — | — | — | — | — |
| | Iodine value | 20 | 48 | 36 | 38 | 50 | 62 | 119 |
| Amount of residual molecular weight modifier having mercapto group (ppm by weight) | | 150 | 140 | 220 | 210 | 200 | 200 | 200 |
| Clogging of metal screen during removal of palladium catalyst | | clogged | none | none | none | none | none | none |

Comparison between Examples 1 to 6 and Comparative Examples 1 and 3 to 8 concludes that the followings are verified. In other words, as shown in Table 1, if the latices of carboxy group-containing nitrile rubbers are heated at 50 to 85° C. in the state where the pH is adjusted in the range of 8.5 to 12, the pH is adjusted in the range of 5 to 8, and the hydrogenation reaction is performed, the resulting carboxy group-containing hydrogenated nitrile rubbers have a lower iodine value and higher production efficiency than those in other cases where the same amount of hydrogenation catalyst is used.

Comparison between Examples 1 to 6 and Comparative Example 2 reveals that, as in Comparative Example 2, an increase in amount of the hydrogenation catalyst used can reduce the iodine value of the resulting carboxy group-containing hydrogenated nitrile rubber while the 80-mesh metal screen is clogged during recovery of the hydrogenation catalyst, resulting in poor production efficiency.

The invention claimed is:

1. A method for producing a carboxy group-containing hydrogenated nitrile rubber, comprising:
   a step of preparing a latex of a carboxy group-containing nitrile rubber by emulsion polymerizing a monomer mixture in a dispersive medium, the monomer mixture containing at least an α,β-ethylenically unsaturated nitrile monomer and a carboxy group-containing monomer;
   a step of heating the latex of the carboxy group-containing nitrile rubber at 50 to 85° C. in the state where the pH is adjusted in the range of 8.5 to 12; and
   a step of subjecting the latex of the carboxy group-containing nitrile rubber after the heating to a hydrogenation reaction in the presence of a hydrogenation catalyst in the state where the pH is adjusted in the range of 5 to 8.

2. The method for producing a carboxy group-containing hydrogenated nitrile rubber according to claim 1, wherein the latex of the carboxy group-containing nitrile rubber is heated under a reduced pressure condition.

3. The method for producing a carboxy group-containing hydrogenated nitrile rubber according to claim 1, further comprising a step of removing the hydrogenation catalyst from the latex of the carboxy group-containing nitrile rubber after the hydrogenation reaction.

4. The method for producing a carboxy group-containing hydrogenated nitrile rubber according to claim 1, wherein the carboxy group-containing hydrogenated nitrile rubber contains 5 to 60 wt % of the α,β-ethylenically unsaturated nitrile monomer and 1 to 30 wt % of the carboxy group-containing monomer.

5. A method for producing a cross-linkable rubber composition, comprising:
   producing a carboxy group-containing hydrogenated nitrile rubber by the method according to claim 1; and
   mixing the carboxy group-containing hydrogenated nitrile rubber with a cross-linking agent.

6. A method for producing a cross-linked rubber, comprising:
preparing a cross-linkable rubber composition by the method according to claim 5; and
cross-linking the cross-linkable rubber composition.

* * * * *